(12) United States Patent
Morovic et al.

(10) Patent No.: US 11,057,545 B2
(45) Date of Patent: Jul. 6, 2021

(54) WEIGHTING FUNCTIONS WHICH VARY WITH INTENDED AREA COLOR VALUES

(71) Applicant: HEWLETT-PACKARD DEVELOPMENT COMPANY, L.P., Spring, TX (US)

(72) Inventors: Peter Morovic, Sant Cugat del Valles (ES); Jan Morovic, London (GB); Victor Diego Gutierrez, Sant Cugat del Valles (ES); Alex Campa Coloma, Sant Cugat del Valles (ES); Javier Maestro Garcia, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/978,328

(22) PCT Filed: Apr. 30, 2018

(86) PCT No.: PCT/US2018/030116
§ 371 (c)(1),
(2) Date: Sep. 4, 2020

(87) PCT Pub. No.: WO2019/212462
PCT Pub. Date: Nov. 7, 2019

(65) Prior Publication Data
US 2021/0006687 A1 Jan. 7, 2021

(51) Int. Cl.
*H04N 1/60* (2006.01)
*H04N 1/64* (2006.01)

(52) U.S. Cl.
CPC .......... *H04N 1/644* (2013.01); *H04N 1/6008* (2013.01); *H04N 1/6077* (2013.01)

(58) Field of Classification Search
None
See application file for complete search history.

(56) References Cited

U.S. PATENT DOCUMENTS

| | | |
|---|---|---|
| 6,698,860 B2 | 3/2004 | Berns |
| 9,185,266 B2 | 11/2015 | Edge |
| 2006/0077489 A1* | 4/2006 | Zhang ............... H04N 1/603 358/504 |
| 2007/0035749 A1* | 2/2007 | Zhang ............... H04N 1/6016 358/1.9 |
| 2007/0211272 A1* | 9/2007 | Kang ............... H04N 1/6058 358/1.9 |
| 2009/0022395 A1* | 1/2009 | Cho ................... G09G 5/06 382/167 |
| 2010/0214576 A1 | 8/2010 | Morovic |
| 2011/0096344 A1* | 4/2011 | Morovic ............ H04N 1/6033 358/1.9 |
| 2011/0096345 A1 | 4/2011 | Benedicto |

(Continued)

*Primary Examiner* — Ted W Barnes
(74) *Attorney, Agent, or Firm* — HP Inc. Patent Department (57) ABSTRACT

In an example a method includes deriving a print agent coverage vector specifying an area coverage for each of a plurality of elements, wherein each element is associated with a print agent, a print agent combination or an absence of print agent. Deriving the print agent coverage vector comprises, for a first element of the print agent coverage vector, applying a first weighting function which varies based on an intended area color value.

15 Claims, 4 Drawing Sheets

(56) References Cited

U.S. PATENT DOCUMENTS

| | | | |
|---|---|---|---|
| 2011/0096364 A1* | 4/2011 | Morovic | H04N 1/6058 |
| | | | 358/3.06 |
| 2012/0113441 A1* | 5/2012 | Hama | H04N 1/6058 |
| | | | 358/1.9 |
| 2012/0327477 A1 | 12/2012 | Edge | |
| 2016/0057314 A1* | 2/2016 | Morovic | H04N 1/00954 |
| | | | 358/3.23 |
| 2016/0182763 A1* | 6/2016 | Morovic | H04N 1/6019 |
| | | | 358/3.06 |
| 2017/0048420 A1* | 2/2017 | Morovic | H04N 1/6008 |
| 2017/0048421 A1* | 2/2017 | Morovic | H04N 1/6008 |
| 2017/0126931 A1* | 5/2017 | Morovic | H04N 1/6016 |
| 2018/0007237 A1* | 1/2018 | Morovic | H04N 1/6058 |

\* cited by examiner

WEIGHTING FUNCTIONS WHICH VARY WITH INTENDED AREA COLOR VALUES

BACKGROUND

Printing systems may convert input data (for example, data representing an image for two-dimensional printing, or data representing an object for three-dimensional printing) to print instructions, which specify where print materials (for example, colorants such as inks or toners or other printable materials) are to be placed in a print operation. In some examples, printing systems may implement data transformations that convert pixels of an input image in RGB (or in any other color space) to drops of print agent (e.g. ink) on a media. The data transformation may also include transformation of the input image into a format suitable for printing using drops of printing fluid, for example halftoning the input image into a pattern of dots. These transformations may be achieved in a plurality of stages, for example to generate the control data for controlling a printing device to deposit the drops of printing fluid.

BRIEF DESCRIPTION OF DRAWINGS

For a more complete understanding, reference is now made to the following description taken in conjunction with the accompanying drawings in which.

DETAILED DESCRIPTION

In the case of two-dimensional printing, a print addressable location may be represented by at least one pixel, and each print addressable location may be printed with at least one colorant such as ink(s) (for example cyan, magenta, yellow and black inks), coatings or other print agents, as well as combinations of those print materials.

In the case of three-dimensional printing, which is also referred to as additive manufacturing, three-dimensional space may be characterised in terms of 'voxels', i.e. three-dimensional pixels, wherein each voxel occupies or represents a discrete volume. In examples of three-dimensional printing therefore, an addressable area may comprise at least one voxel and each voxel may be 'printed' i.e. generated or manufactured, using one or a combination of agents and/or build materials.

To briefly discuss three-dimensional printing in greater detail, objects generated by an additive manufacturing process may be formed in a layer-by-layer manner. In one example, an object is generated by solidifying portions of layers of build material. In examples, the build material may be in the form of a powder or powder-like material, a fluid or a sheet material. In some examples, the intended solidification and/or physical properties may be achieved by printing an agent onto a layer of the build material. Energy may be applied to the layer and the build material on which an agent has been applied may coalesce and solidify upon cooling. In other examples, directed energy may be used to selectively cause coalescence of build material, or chemical binding agents may be used to solidify a build material. In other examples, three-dimensional objects may be generated by using extruded plastics or sprayed materials as build materials, which solidify to form an object.

Some processes that generate three-dimensional objects use control data or print instructions generated from a model of a three-dimensional object. This control data may, for example, specify the locations at which to apply an agent to the build material, and/or where a build material itself may be placed, and the amounts to be placed. The control data may be generated from a 3D representation of an object to be printed. Locations may be expressed in terms of voxels. A voxel at a given location may have at least one characteristic. For example, it may be empty, may have a particular color or may represent a particular material, or a particular object property, or the like. In general, the voxels of an object may each have the same shape (for example, cuboid or tetrahedral), or may differ in shape and/or size. However, where the term voxel is used herein to refer to a print addressable location, the voxel size may be determined bearing in mind the print resolution of a print apparatus, i.e. it may correspond to a volume which can be individually addressed by a print apparatus (which may be a particular print apparatus, or a class of print apparatus, or the like) such that the properties thereof can be determined at least substantially independently of the properties of other voxels.

In some examples, possible print materials to be applied to an addressable location are specified within an element set referred to herein as a vector. In some examples, the print materials may be identified explicitly, i.e. in a set of elements comprising a set of print materials and/or print material combinations. In other examples, it may be that at least one of the elements of an element set relates to other qualities, which may in turn be related to print materials. For example, an element may specify a property or the like which can be mapped to print materials. In another example, a color may be specified in terms of a Neugebauer Primary (NP) (wherein the set of NPs is the set of the colors (and in some examples, the number of drops of printing agent) which can be applied by a particular print apparatus, as discussed in greater detail below), which in turn may have predetermined mappings to colorants.

In some examples, a set of elements is expressed as a print agent coverage vector which defines print material data, for example detailing (explicitly or implicitly, for example via a mapping) the amount of print materials (such as a colorant or coating for two dimensional printing or an agent(s) to be deposited onto a layer of build material, or in some examples, build materials themselves for three dimensional printing), and, if applicable, their combinations. Such print materials may be related to or selected to provide an image or object property such as, for example, color, transparency, flexibility, elasticity, rigidity, surface roughness, porosity, conductivity, inter-layer strength, density, and the like. Another example of a vector is an ink vector, which specifies proportions of inks to be applied (and may therefore be thought of as native to a printer), or print agent vectors, which specify proportions of print agents (which may include inks and/or other print agents), without specifying combinations thereof. These may be considered to a special case of a print agent coverage vector, which are explicitly identified in the description which follows.

For example, a print addressable location within input data (for example, a pixel in image data or a voxel in object model data) may be associated with one or a set of print agent coverage vectors. These may be referred to as Neugebauer Primary Area Coverage vectors (NPac vectors, or simply NPacs, herein), which may specify colors in a manner which may be associated with inks or other colorants and their combinations in terms of Neugebauer Primary. By analogy, in three-dimensional printing, print agent vectors, which specify proportions of print agents to be applied may be referred to as Material Volume coverage vectors (termed Mvoc vectors, or simply MVocs, herein), which may also specify combinations of print agents. Such area or volume coverage vectors (NPacs and MVocs, referred to as print agent coverage vectors collectively herein) may provide a probability that a print material, a combination of print materials, or no print agent may be applied in a location. In a simple case, such a vector may indicate that X % of a given region should have a particular print material or print material combination applied thereto, whereas (100−X) % should be left clear of the print material. In practise, this may be resolved at the addressable resolution for the print material and/or printing device. Therefore, if there are N×M addressable locations in an XY plane associated with such a vector, X % of these locations may receive a print material, while (100−X) % do not.

Such a print agent coverage vector may provide a plurality of values, wherein each value defines a probability for each print material, or each combination of print materials described. For example, in a printing system with two available print agent (for example, inks, coatings or any other print agent)—M1 and M2, where each print agent may be independently deposited in an addressable area (e.g. voxel or pixel), there may be $2^2$ (i.e. four) probabilities in a given print coverage vector: a first probability for M1 without M2; a second probability for M2 without M1; a third probability for an over-deposit (i.e. a combination) of M1 and M2, e.g. M2 deposited over M1 or vice versa; and a fourth probability for an absence of both M1 and M2. In this example, it is assumed that a drop of print agent may be applied or not: i.e. a binary choice may be made and the value for each agent may be either 0 or 1. In this case, a print coverage vector may be: [M1, M2, M1M2, Z] or with example probabilities [M1:0.2, M2:0.2, M1M2:0.5, Z:0.1]—in a set of print addressable locations (e.g. an set of [x, y] or [x, y, z] locations (which in some examples may be a [x, y] location in a z slice)) to which the coverage vector applies, 20% of locations are to receive M1 without M2, 20% are to receive M2 without M1, 50% are to receive M1 and M2 and 10% are to be left clear (Z). In non-binary systems, there may be more elements defined describing the different amounts of print agent and/or associated combinations of print agents, which may be applied. As each value is a proportion and the set of values represent the available agent combinations, the set of values in each print coverage vector generally sum to 1, or to 100%.

In some examples, as mentioned above, the elements of a vector are Neugebauer Primaries (NPs). For a binary (bi-level) printer, an NP is one of $2^k$ combinations of k print agents within the printing system, wherein inks can be represented in single-drop states, in a k-dimensional color space. For example, if a printing device uses CMY inks there can be eight NPs, these NPs relate to the following: C, M, Y, C+M overprinting (or blue), C+Y overprinting (or green), M+Y overprinting (or red), C+M+Y overprinting (or black), and W (or white or blank indicating an absence of ink). As is clear, a printing device with many primary inks and many ink-drop states can have more NPs available than a printing device having a few primary inks and having bi-level states.

In another example of a vector—ink or print agent vectors—the area/volume coverage is controlled but the 'at pixel' or 'at voxel' choices are not: i.e. the vector may specify that X % of a region receives agent M1 and Y % receives agent M2, but the overprinting of agents is not explicitly defined (although the sum of X and Y may be greater than 100, so overprinting may result). Such a vector may be termed a print agent, or ink, vector.

Print agent coverage vectors may therefore specify a plurality of elements which are related to print agents, and a probability for each element.

Figure 1:
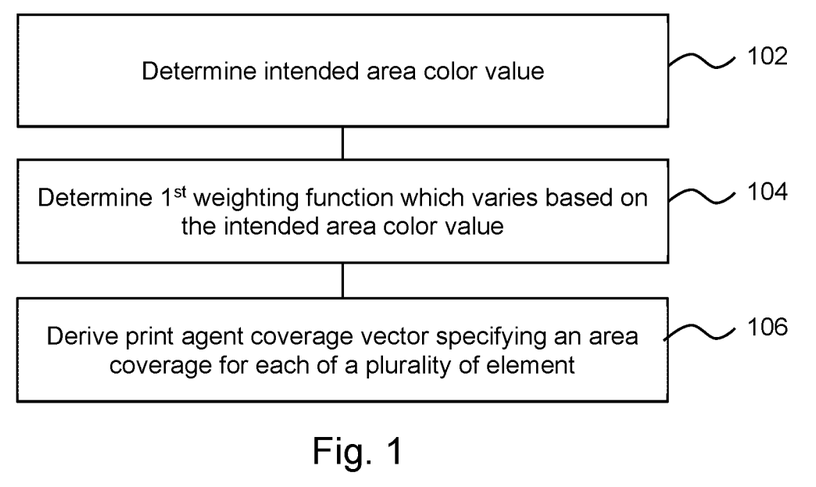
FIG. 1 is a simplified schematic of an example method of deriving a print agent coverage vector.

FIG. 1 is an example of a method, which may be a computer implemented method of determining a print agent coverage vector for a color mapping resource.

Block 102 comprises determining an intended area color value. This may for example comprise a target RGB value, or sRGB value, a CIE L* color value, an ICC color value, or a value in some other color space. More generally stated, block 102 may comprise determining a particular color (e.g. a green, blue or pink) which is intended to be produced by a print agent coverage vector to be defined.

Block 104 comprises determining a first weighting function which varies based on the intended area color value.

Block 106 comprises deriving a print agent coverage vector specifying an area coverage for each of a plurality of elements, wherein each element is associated with a print agent, a print agent combination or an absence of print agent, by applying the weighting factor.

Deriving the print agent coverage vector in block 106 may comprise selecting from a set of a possible print agent coverage vectors. In some examples, the selection may be made between a set of print agent coverage vectors corresponding to a particular print agent vector. There may be more than one print agent coverage vector which is associated with a particular print agent vector (hereinafter referred to as an ink vector), which may produce the same or a different color. For example, an ink vector may specify that a print output may comprise, over an area to which the vector applies, one drop of cyan to every two drops of magenta. Corresponding print agent coverage vectors could include [C:0.5, MM:0.5], [CM:0.5, M:0.5], [C:0.3; CM:0.2, M:0.3], etc. The amount of ink may remain the same in each print agent coverage vector.

However, the different print agent coverage vectors may exhibit different characteristics. For example, the color, color consistency, noise, smoothness, ink usage, graininess or the like may differ between the different print agent coverage vectors which relate to the same ink vector ("ink equivalent print agent coverage vectors" herein). In some examples, color will be tested to characterise a print agent coverage vector. For example, this may comprise printing a sample using a particular vector and measuring the result with a colorimeter or the like. Some ink equivalent print agent coverage vectors may be more robust to variable printing device operating parameters, such as ink drop placement errors, nozzle health, missing nozzles, misalignment, ink drop weight variations, or the like.

It has been proposed to select print agent coverage vectors for inclusion in a look-up table which provides a color mapping resource for use in generating print control data on the basis of their characteristics. For example, those print agent coverage vectors which minimise graininess may be selected for a look-up table which is to be used to result in high quality prints. In another example, those print agent coverage vectors which are associated with low ink usage may be selected for a look-up table which is to be used to result in a low ink-usage print, and the like. In other examples, print agent coverage vectors which exhibit the lowest level of variations during simulations of fluctuations in the printing device operating parameters, such as ink drop placement errors, nozzle health, missing nozzles, misalignment, ink drop weight variations, or the like. This may be thought of as optimizing a color mapping resource for a particular purpose.

However, the method of FIG. 1 suggests that a weighting function which varies based on the intended area color value may be used, and may be applied to at least one agent/agent combination. In other words, rather than a single optimization criteria being applied to a whole color space, the optimization criteria may change throughout the color space.

To consider one example of 'optimization', it may be the case that blank media may be, in general, undesirable. Viewed another way, it may be more desirable that a print agent droplet is dispensed onto a print addressable location in a region which is associated with a particular color than that no print agent droplet is dispensed. This may be because blank media (for example a blank white page) tends to be bright and this can result in high contrast between a blank space and a neighbouring space to which print agent is applied, in turn having the appearance of graininess.

To consider the RGB value [208, 128, 255], this color may be produced by either of the following two print agent coverage vectors, which correspond to the same ink vector:

A: [w: 0.5, m: 0.37, mc: 0.10, Mm: 0.02, mC: 0.01]
B: [w: 0.6, m: 0.27, mmc: 0.10, Mm: 0.02, mC: 0.01]

Where w represents a blank space, m represents a light magenta, c represents light cyan, M represents magenta and C represents cyan (in this example, all undescribed NPs are associated with a probability of selection of 0).

If leaving print addressable areas of the substrate blank is determined to be undesirable, then vector A may be considered to be preferable over vector B.

While in other examples, the print agent coverage vector for inclusion in a color mapping resource may be selected for example following experimentation, in some examples, in order to identify which vector is preferable, an objective function may be applied which has the same dimensions as the vector, and which assigns a weight or penalty to the various probabilities. Thus, in this example, a weighting function may be applied as follows:

f=[X, 0, 0 . . . 0]

In other words, in this example, where the presence of blank media is to be penalised, the blank media NP (w) is associated with a weight of X, where X>0, and all other NPs are associated with the weighting of 0. Of course, this is a simple example and in other examples, combinations of NPs may be given weightings. For example, a vector which penalises overprinting (i.e. printing combinations of print agents at a single location, rather than a single print agent drop) is also likely to result in minimising the amount of blank space. Thus, NPs which specify overprinting may also or alternatively be penalised, for example with the same or a different value.

The optimization problem can be formulated to find the minimum result of applying the function to a plurality of ink equivalent print agent coverage vectors over a set of ink vectors. As is set out in greater detail below, linear inequalities may define the convex subspace of a set of ink equivalent print agent coverage vectors. A linear objective function may be optimized over this set using methods such as Random sample consensus (RANSAC) and/or Monte-Carlo sampling, in which print agent coverage vectors (for example taken from the convex hull of set of print agent coverage vectors) are sampled and evaluated against the objective function. In other examples, a convex programming approach that finds a global minimum, in which case optimization problem can now be formulated as follows:

First, the constraints on the print agent coverage vectors may be considered. Since they represent area coverage proportions or probabilities, they are convex, such that:

$$\forall n_i: 0 \leq n_i(j) \leq 1$$

$$\Sigma_{j=1}^{M} n_i(j)=1,$$

Where $n_i$ is a print agent coverage vector corresponding to the ith color in a set of colors. If the $o_i$ is the ink vector for the ith color, and N is a matrix such that $n_i*N=o_i$, it can be determined $$A*n_i \leq b$$

$$C*n_i = d$$

Where $$A = \begin{bmatrix} I \\ -I \end{bmatrix}, b = \begin{bmatrix} 1 \\ \underline{0} \end{bmatrix}, C = \begin{bmatrix} 1\ 1\ \ldots\ 1 \\ N \end{bmatrix}, d = \begin{bmatrix} 1 \\ o_i \end{bmatrix},$$

where I is the M×M identity matrix and $\underline{0}$ and $\underline{1}$ are M×1 column vectors, of 0s and 1s respectively.

Joining the constraints and the objective function gives:

$$\min_{n_i} f*n_i + x$$

Where x is a constant offset vector of the same size as f. Since the constraints are convex and the objective function is linear, this is a linear programming problem that can be solved with established computational methods. More generally however, the objective function may be written as:

$$\min_{n_i} \frac{1}{2} n_i^T H n_i + f n_i + x$$

For some H, f and x, whereby here the quadratic term H is introduced to be part of the minimization. If H is not an identity matrix then the above is referred to as a quadratic programming problem and, like its linear equivalent, has well established solution methods. In general linear and quadratic programming are examples of convex programming techniques, a sub-field of mathematical optimization.

The above framework therefore provides a sequence for finding a print agent coverage vector for inclusion in a mapping resource:

1. Given an existing print agent coverage vector, compute its print agent vector.

2. Construct the linear inequalities and equalities as shown above, based on the set of NPs involved in the print agent coverage vectors, the target print agent vector and the target optimization function (as defined by [H, f, x]).

3. Compute a new print agent coverage vector that matches target print agent vector and is optimal in terms of the pre-determined objective.

The method of FIG. 1 proposes that X from the function f, or any other weighting factor, may vary based on the intended area color value. For example, the intended area color value may be defined as the sum of input RGB values (sumRGB) describing the color to be achieved. This acts as a proxy for 'lightness', with low values resulting in generally dark colors and high values resulting in lighter colors. The graininess due to blank media may be more apparent for lighter colors as, for darker colors, even high proportions of blank media can result in low grain since the remaining NPs tend to be high drop state NPs, which provide for coverage of most of the substrate. Thus, for high sumRGB values, blank media may be penalised with a high weight (for example a weight of 100) whereas for low sumRGB values, the penalty may be smaller or there may be no penalty at all.

In general, a weighting function could be stated as:

$$f=[np_1(f_1(\text{color value})), np_2(f_2(\text{color value})), np_3(f_3(\text{color value}) \ldots]$$

Where $f_1$ is a first weighting function applied to a first element, in this example an NP, $np_1$, $f_2$ is a second weighting function applied to second element $np_2$, etc. This is a general form of an objective function which specifies relative weights for the elements of the print agent coverage vector for a given intended area color value. In some examples, at least some elements (NPs) may be associated with constant weightings i.e. weightings which are not dependent on the color value. The first and second functions may be different. In some examples, the color values may also be different for different elements, for example relating to the R value for a first element and the B value for a second element, or the like.

While the example of sumRGB has been used (which is one dimensional) as the intended area color value above, in other examples, different values such a CIE L*color value, or a value as specified in an ICC profile (if existent) may be used. In general, the sum of orthogonal planes in any color space may provide a proxy for lightness. In other examples, the weight may depend on R, G, B independently. In other words, the weighting of the NPs can be defined natively in 3D (for RGB) or 4D (for CMYK), etc., freely varying in all 3 (or 4, or n) dimensions.

In some examples, the function dependent on intended area color value may be a linear function, non-linear function (for example a quadratic or sigmoidal function), a stepped or staircase function, or any other function which may be defined. In other examples, the function may apply to a sub-region of the color space (e.g. greens may be treated differently from blues, light reds may be treated differently from dark reds, etc.).

Thus, deriving the print agent coverage vector in block 106 may comprise selecting at least one of a plurality of predetermined 'print agent equivalent print agent coverage vectors' (i.e. mapping to same print agent, or ink, vector), which are referred to herein as 'ink equivalent print agent coverage vectors', following identification of the 'optimized' vector. In other examples, a whole lookup table comprising vectors which have characteristics which change depending on the intended area color value may be determined by combining two different lookup tables, one of which is optimized a first end function and the other of which is optimized for the second end of the function. The lookup tables could be combined according to the behaviour specified by the function to select or, in other examples, to interpolate new vectors. Therefore, in other examples, deriving the print agent coverage vector in block 106 may comprise interpolating a print agent coverage vector, for example by forming a weighted average of two or more print agent coverage vectors which are optimised for different criteria. The weighting given to a print agent coverage vector subject to a particular optimisation criteria may vary based on the intended color value.

To consider the 8-bit encoded RGB value [240, 178, 255] (sumRGB=671), this color may be produced by either of the following two ink equivalent print agent coverage vectors:
 C: [w: 0.75, m: 0.21, mmc: 0.04]
 D: [w: 0.79, m: 0.17, mmc: 0.04]

These may be considered in conjunction with the vectors A and B outlined above, which are associated with a sumRGB value of 591.

In a first example, it is assumed that blank media is penalised 100% above sumRGB=600, and not at all below this value, and that single-drop states are penalised at a constant value throughout the color space. In that case, a look up table may be determined which includes vectors B and C (since A contains a higher probability of a single drop state of 0.37 than B, and as A and B relate to an RBG value below 600, there is no penalty for blank or w elements below 600, and C specifies a lower w value than D, and relates to a sumRGB value above 600, so blank media is penalised).

In a second example, there may be a linear penalisation of blank media w throughout the color space from sumRGB=0 having 0% penalty to sumRGB=765 having a 100% penalty. In such an example, a look up table may be determined which includes vectors A and C (since D contains a higher probability of blank media than C). The lower w vector will be chosen so long as the penalization follows the same behaviour. However, if the progressive objective function changes (e.g. such that single-ink NPs are penalised more than blank media or overprints), a vector with a higher w value may be chosen over an ink vector equivalent vector. In another example, vectors may be derived in block 106 using linear or quadratic programming methods, for example to find the solution to an objective function of the form:

$$\min_{n_i} \frac{1}{2} n_i^T H n_i + f n_i + x$$

Where $n_i$ is an ink-vector, f is the linear function outlined above, H is a quadratic term and x is a constant offset vector which is the same size as f. In one example, this may be used to compute a print agent coverage vector which matches an ink vector and is optimal over a pre-determined objective function.

In some examples, a color mapping resource comprising a look-up table (LUT) may be defined, in which some RGB (or other color space, e.g. CMYK) values are mapped to vectors. Such a LUT may include vectors which are dispersed throughout the color space. When a color without a corresponding explicitly defined vector is to be printed, intermediate vectors may be interpolated, for example by determining a weighted sum of vectors forming a polyhedron (in 3D) or more generally a polytope, which encloses the target color, where the vertices of the polytope are defined print agent coverage vectors, as is defined in greater detail below in relation to FIG. 4. In some examples, the polytope chosen has the smallest number of vertices appropriate (e.g. a triangle in 2D space, a tetrahedron in 3D space, etc).

This allows combination of various optimization strategies within a single color mapping resource by dynamically transitioning between different optimization approaches.

Figure 2:
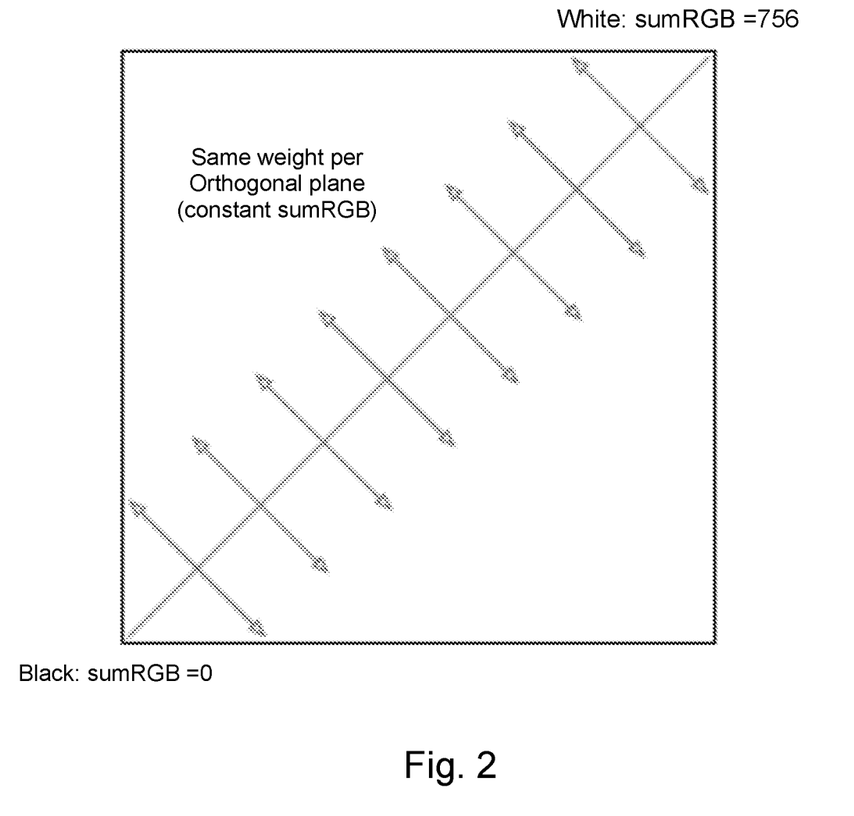
FIG. 2 is an example of a color space.

FIG. 2 shows an example of an RGB color space projected into a plane, where the diagonal line indicates increasing lightness and the lines orthogonal to the diagonal indicates planes of constant lightness. This shows how the sum RGB value is a proxy for lightness.

Figure 3A:
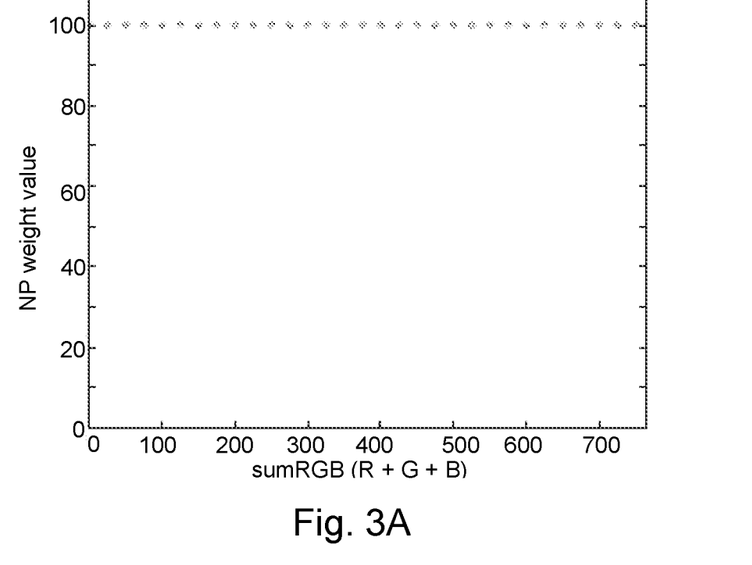
FIGS. 3A and 3B show examples of weighting functions.
Figure 3B:
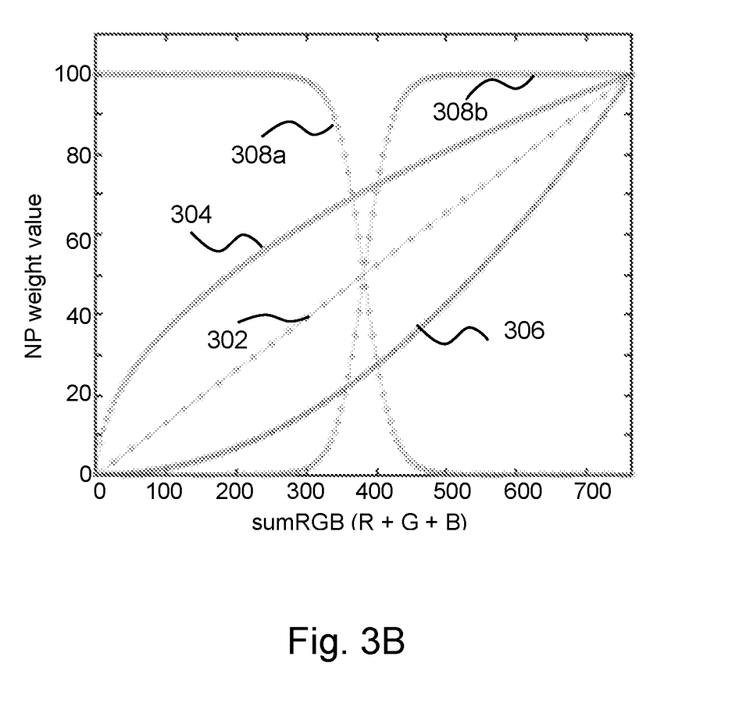

FIG. 3A shows, for the sake of comparison, a static objective function which is the same objective function used for all sumRGB values. FIG. 3B shows an example of some 'dynamic' functions that vary as a function of an area color value, in this case a sumRGB value. In this example, a linear function 302 increases as lightness increases (from the value of 0 that does not penalise an element of the vector to a value of 100 that maximally penalises it). A quadratic function 304 and a square root function 306 that grow respectively faster and slower than the linear function 302 are also shown. Finally, there are two examples of sigmoid functions 308a, 308b which are near constant for part of the range and smoothly transition to another near constant value for a second part of the range. Any such (or other) functions could be applied to one or more element of a set of ink equivalent print agent coverage vectors in any combination to determine an 'optimal' choice for a color mapping resource, where the optimal criterial changes throughout the color space.

Whilst staircase functions could be used, as noted above (i.e. functions without smooth transitions), it may be that the visual impression of smooth functions is preferable in a printed output where this is a factor.

Figure 4:
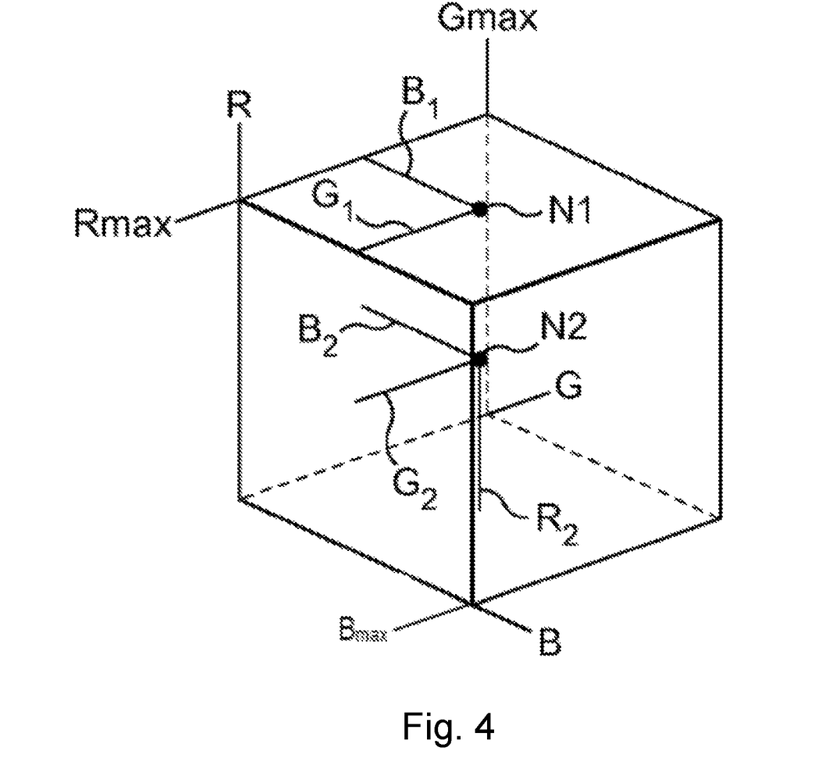
FIG. 4 is a diagram representing an example of a three-dimensional look-up-table.

FIG. 4 is a schematic representation of an example of a 3D (in this example, an RGB) LUT which provides a color mapping resource. The LUT shown has the form of a cube and is indexed in a color space of the input image, which is RGB in this example. The table has nodes N1, N2, each of which contains data defining at least one vector to be used to reproduce a particular color having coordinates R, G, B. For any node indexed by an RGB value, the node contains at least one vector that when halftoned over a unit area results in an output color space (for example, an XYZ color space) that is chosen to map to the color space of the input image.

FIG. 4 shows by way of example a surface node N1 having coordinates Rmax, G1, B1 and an interior node N2 having coordinates R2, G2, B2. The nodes at the surface may be regarded as being in a layer at the surface. Successive layers of nodes lie below the surface. Thus, the LUT in this example provides a discrete, non-continuous, representation of the colors to be printed.

In an example, an initial lookup table, in which at least some nodes comprise print agent coverage vectors, may be optimized to comply with a variable objective function, such that vectors are selected from sets of ink equivalent print agent coverage vectors. In another example, vectors may be selected from a plurality of LUTs for inclusion in an optimized LUT based on their relative results when the objective function is applied. In some examples, linear or quadratic programming may be used to determine a set of print agent coverage vectors to include in a look up table. In other examples, sampling methods (for example RANSAC and/or Monte Carlo sampling methods) may be used to sample (for example, randomly sample) the print agent coverage vectors that fall within convex constraints of a print agent coverage vector set as described above. The identified print agent coverage vectors may be evaluated by computing the objective function), and the 'best' print agent coverage vectors, according to the objective function, may be retained, for example in a LUT. In other examples the nodes may comprise interpolated print agent coverage vectors, which may be interpolated from print agent coverage vectors optimised for different criteria.

In some examples, a full gamut color LUT may be optimized to provide a further LUT which includes vectors which are optimal given a variable function throughout the color space. In some examples, the color space may be divided into a plurality of cells and an optimization is carried out on a cell-by-cell basis to find the optimal vector of that cell. For example, at least one optimized print agent coverage vector (NPac or Mvoc) may be retained for each node for each cell.

The LUT provides a mapping from input image color space (or object space for 3D printing) to a print agent area coverage vector. In some examples, this LUT is a mapping of a sample of the RGB values to print agent coverage vectors. The sampling may be regular sampling of the RGB cube. For example, for two levels this would yield 8 samples/nodes (the vertices), for three levels there would be 29 explicitly defined samples/nodes, etc. which form regular grid values.

In use of the LUT, a vector corresponding to an input color value may be selected (if the input color value is a node), or interpolated from at least two vectors (if the input color is not a defined node, as is further set out below). A halftone threshold matrix may be applied to select an element (e.g. an NP) of the vector for each of a plurality of print addressable locations. In one example, this halftoning exercise may return the first element whose cumulative area coverage (i.e. the sum of the probability associated with that element and all previous elements) exceeds the threshold value. In some examples, a method further comprises printing print agent corresponding to the selected element at the print addressable location.

For example, NPac area coverages (in a cumulative representation) may be compared against a threshold of the threshold matrix corresponding to a print addressable location and the first NP whose cumulative area coverage exceeds the threshold may be selected for that location. For example, if the NPac is [W=70%, C=10%, M=20%], then its cumulative representation is [W=70%, C=80%, M=100%]. The threshold matrix may comprise values between 0 and 100, each threshold being associated with a print addressable location. For a threshold value of up to 70, the corresponding halftone location is left blank (white), for a threshold value between 70 and 80, cyan is selected and for a threshold above 80, magenta is selected.

In some examples, the LUT (color mapping resource) may be built off-line, e.g. independently of the printing system. However, in other examples, the LUT may be produced by print apparatus.

As mentioned above, if no explicit entry for the input color value exists in the LUT, an interpolation may be performed. This may be achieved by determining the smallest polyhedron (e.g. tetrahedron or cube) formed by RGB values which are included in the LUT which encloses the input value. Barycentric coordinates may be computed for the color value of the input cell and the enclosing polyhedron RGB values and these coordinates are applied as weights to the nodes of the enclosing polyhedron. In some examples, the values need to be integer values (drops of printing fluid) for printability (it may not be possible to print fractional drops) and any floating point output of the interpolation may be rounded to integer values.

In an example, there may be two nodes, N1 with a CMYK ink drop vector of [0, 2, 1, 0] (i.e., no cyan or black ink, two drops of magenta a drop of yellow) and N2, with a CMYK ink drop vector of [0, 0, 2, 0]. It may be determined that an intermediate color value is to be printed which is closer to N1 than N2, such that N1 and N2 are to be combined with respective weights of 0.8 and 0.2. The resulting interpolated ink drop vector would be [0, 1.6, 1.2, 0], which after rounding would become [0, 2, 1, 0].

Figure 5:
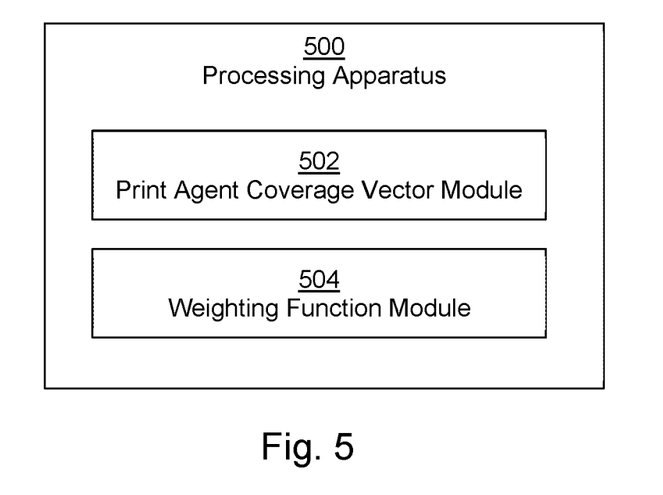
FIG. 5 shows an example of a processing apparatus.

FIG. 5 is an example of a processing apparatus 500 comprising a print agent coverage vector module 502 and a weighting function module 504.

In use of the apparatus 500, the print agent coverage vector module 502 determines a plurality of print agent coverage vectors, each of the vectors comprising a set of elements, wherein each element is associated with a print agent, a print agent combination, or an absence of print agent. The weighting function module 504 applies a weighting function in determining (selecting or deriving) the print agent coverage vectors, such that the weight of at least one element within the set of elements varies according to an intended area color value.

In some examples, the intended area color value is a measure of lightness as described above. In some examples, the weighting function is to vary the weight of an element associated with the absence of print agent. The weighting function may be linear or non-linear (for example quadratic), and in some examples, the weighting function is multidimensional, such that it varies in more than one axis in the color space. For example, the function may be linear in the R dimension and non-linear in the B dimension of an RGB color space. In some examples, different elements may vary based on different intended area color values. In some examples, the relationship is fully independent in all dimensions such that the objective function weights may vary across the RGB cube (or any other color space) in a free and unconstrained manner (which need not follow an analytical function). In some examples, the nature of the objective function is defined (e.g. as linear, quadratic or the like), so as to be well behaved and have single minima etc., and such that linear and/or quadratic programming techniques may be applied.

Figure 6:
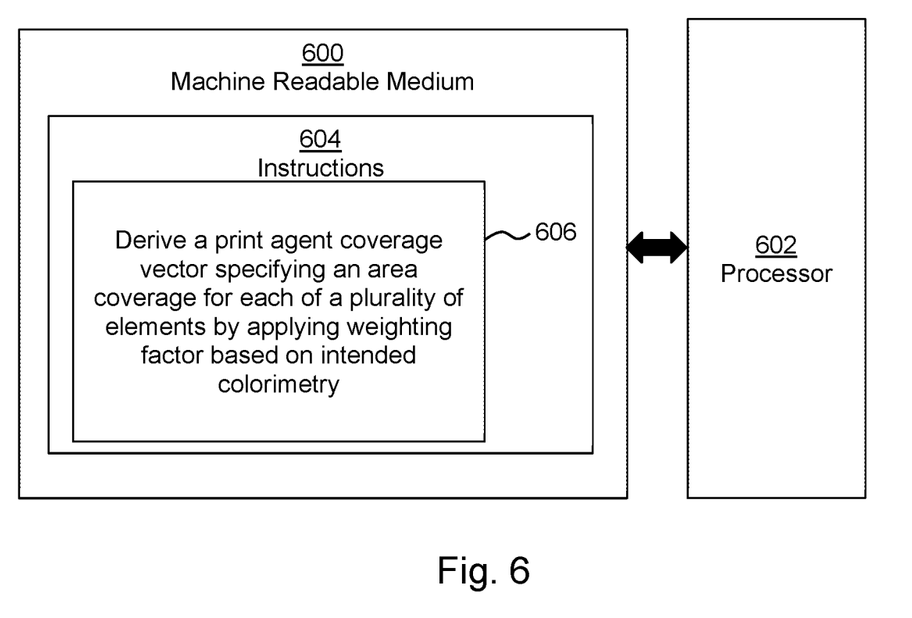
FIG. 6 shows an example of a processor in association with a machine readable medium.

FIG. 6 is an example of a tangible machine readable medium 600 associated with a processor. The machine readable medium 600 stores instructions 604 which, when executed by the processor 602, cause the processor 602 to carry out actions. The instructions 604 comprise instruction 606 to cause the processor 602 to derive a print agent coverage vector specifying an area coverage for each of a plurality of elements, wherein each element is associated with a print agent, print agent combination or an absence of print agent, wherein deriving the print agent coverage vector comprises, for a first element of the print agent coverage vector, applying a weighting factor selected based on an intended area colorimetry of the print agent coverage vector. The colorimetry may be determined based on a color value as described above.

Examples in the present disclosure can be provided as methods, systems or as a combination of machine readable instructions and processing circuitry. Such machine readable instructions may be included on a non-transitory machine (for example, computer) readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry, or a module thereof, may execute the machine readable instructions. Thus functional modules of the processing apparatus 500 (for example, the print agent coverage vector module 502 and the weighting function module 504) and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer program product, the computer program product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that many implementations may be designed without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   deriving a print agent coverage vector specifying an area coverage for each of a plurality of elements, wherein each element is associated with a print agent, a print agent combination or an absence of print agent,
   wherein deriving the print agent coverage vector comprises, for a first element of the print agent coverage vector, applying a first weighting function which varies based on an intended area color value.

2. A method according to claim 1 wherein deriving the print agent coverage vector comprises, for a second element of the print agent coverage vector, applying a second weighting function which varies based on the intended area color value.

3. A method according to claim 1 further comprising determining the intended area color value by summing color values of an input color space.

4. A method according to claim 1 wherein deriving the print agent coverage vector comprises applying an objective function specifying relative weights for the elements of the print agent coverage vector for a given intended area color value.

5. A method according to claim 1 wherein deriving the print agent coverage vector comprises combining two print agent coverage vectors according to the first weighting function.

6. A method according to claim 1 comprising deriving a set of print agent coverage vectors associated with a plurality of different intended area color values.

7. A method according to claim 6 further comprising selecting at least one print agent coverage vector based on an input color value, selecting an element of a selected print agent coverage vector, and printing print agent corresponding to the selected element.

8. A method according to claim 6 comprising selecting at least two print agent coverage vectors and determining a new selected print agent coverage vector by interpolation.

9. A processing apparatus comprising:
a print agent coverage vector module to determine a plurality of print agent coverage vectors, each of the print agent coverage vectors comprising a set of elements, wherein each element is associated with a print agent, a print agent combination, or an absence of print agent; and
a weighting function module to apply a weighting function in determining the print agent coverage vectors, such that a weight of at least one element within the set of elements varies with an intended area color value.

10. A processing apparatus according to claim 9 wherein the intended area color value is a measure of lightness.

11. A processing apparatus according to claim 9 wherein the weighting function is to vary a weight of an element associated with the absence of print agent.

12. A processing apparatus according to claim 9 wherein the weighting function is linear.

13. A processing apparatus according to claim 9 wherein the weighting function is non-linear.

14. A processing apparatus according to claim 9 wherein the weighting function is multidimensional.

15. A non-transitory machine readable medium comprising instructions which,
when executed by a processor, cause the processor to:
derive a print agent coverage vector specifying an area coverage for each of a plurality of elements, wherein each element is associated with a print agent, print agent combination or an absence of print agent, wherein deriving the print agent coverage vector comprises, for a first element of the print agent coverage vector, applying a weighting factor which varies based on an intended area colorimetry of the print agent coverage vector.

* * * * *